United States Patent [19]

Ogura et al.

[11] Patent Number: 4,483,202
[45] Date of Patent: Nov. 20, 1984

[54] ULTRASONIC FLOWMETER

[75] Inventors: Ichiro Ogura; Ayao Itoh, both of Yokohama, Japan

[73] Assignee: Tokyo Shibaura Denki Kabushiki Kaisha, Kawasaki, Japan

[21] Appl. No.: 479,901

[22] Filed: Mar. 29, 1983

[30] Foreign Application Priority Data

Mar. 29, 1982 [JP] Japan .................................. 57-48857

[51] Int. Cl.³ .............................................. G01F 1/66
[52] U.S. Cl. .................................................. 73/861.27
[58] Field of Search ...................................... 73/861.27

[56] References Cited

U.S. PATENT DOCUMENTS

| | | |
|---|---|---|
| 3,209,591 | 10/1965 | Lester et al. ............... 73/861.29 X |
| 3,918,304 | 11/1975 | Abruzzo et al. . |
| 3,935,735 | 2/1976 | Lee . |
| 4,052,896 | 10/1977 | Lee et al. . |
| 4,334,434 | 6/1982 | Appel et al. ................... 73/861.29 |

FOREIGN PATENT DOCUMENTS

| | | |
|---|---|---|
| 17475 | 10/1980 | European Pat. Off. . |
| 56-43510 | 4/1981 | Japan . |
| 57-77915 | 5/1982 | Japan . |
| 511437 | 8/1971 | Switzerland . |

*Primary Examiner*—Charles A. Ruehl

*Attorney, Agent, or Firm*—Oblon, Fisher, Spivak, McClelland & Maier

[57] ABSTRACT

An ultrasonic flowmeter for measuring a flow rate in a conduit. A pair of ultrasonic transducers are disposed in a conduit so as to oppose each other such that a line connecting the pair of transducers is inclined by a predetermined angle with respect to a fluid flowing direction. The ultrasonic flowmeter includes: driving means for simultaneously driving the pair of ultrasonic transducers; means for measuring the primary time difference between a time when one ultrasonic transducer receives an ultrasonic wave which is radiated from the other ultrasonic transducer and a time when the other transducer receives an ultrasonic wave which is radiated from the first ultrasonic transducer. Additionally, a time difference between the time measured when one ultrasonic transducer receives an ultrasonic wave radiated from one ultrasonic transducer and reflected by the other ultrasonic transducer and a time measured when the other ultrasonic transducer receives an ultrasonic wave radiated from the other ultrasonic transducer and reflected by one ultrasonic transducer. Primary and secondary time difference data is produced by adding signs in accordance with the arrival order of the ultrasonic waves. Time difference data is used to calculate an actual flow rate of the fluid using data of the propagation time difference data.

3 Claims, 8 Drawing Figures

ULTRASONIC FLOWMETER

BACKGROUND OF THE INVENTION

The present invention relates to an ultrasonic flowmeter which operates in accordance with the propagation time difference method.

Figure 1:
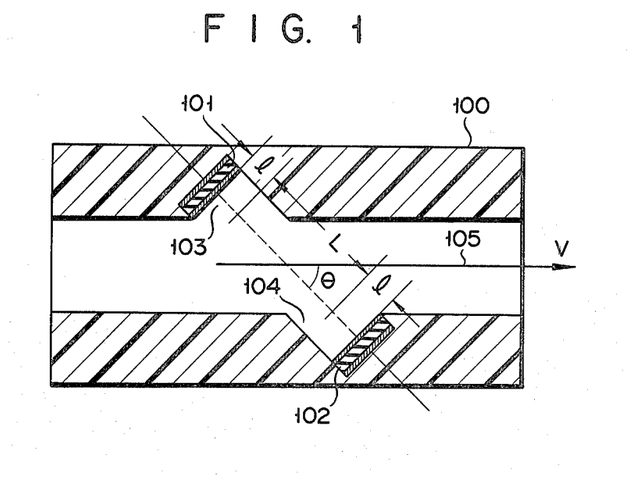
FIG. 1 is a sectional view of a conduit which has a pair of ultrasonic transducers used in an ultrasonic flowmeter according to a first embodiment of the present invention.

The propagation time difference method is known as a method for measuring a flow rate (flow velocity or flow volume) of a fluid such as a gas or a liquid by utilizing an ultrasonic flowmeter. As shown in FIG. 1, a pair of ultrasonic transducers 101 and 102 are mounted in a conduit 100 such that they oppose each other on a line which is inclined by an angle $\theta$ with respect to a fluid flowing direction in the conduit 100. A flow rate, such as the flow velocity of a fluid, is measured in accordance with a propagation time difference $\Delta T$ between the ultrasonic propagation time Td in a downstream direction (i.e., the time required for an ultrasonic wave to propagate from the ultrasonic transducer 101 to the ultrasonic transducer 102) and ultrasonic propagation time Tu in an upstream direction (i.e., the time required for an ultrasonic wave to propagate from the ultrasonic transducer 102 to the ultrasonic transducer 101).

The propagation times Td and Tu are given as follows:

$$Td = 2l/C + L/(C + V\cos\theta) \quad (1)$$

$$Tu = 2l/C + L/(C - V\cos\theta) \quad (2)$$

where
- l is the length of a region (recess) 103 or 104 which is free from the influence of the flow velocity of the fluid between the ultrasonic transducers 101 and 102,
- L is the length of a region which is influenced by the flow velocity of the fluid between the ultrasonic transducers 101 and 102,
- V is the flow velocity of the fluid,
- $\theta$ is the angle formed between a direction indicated by an arrow 105 and a line (indicated by a dotted line) connecting the ultrasonic transducers 101 and 102, and
- C is the sonic velocity in a fluid at rest.

The propagation time difference $\Delta T$ is thus given as follows:

$$\Delta T = Tu - Td \quad (3)$$
$$= 2LV\cos\theta/(C^2 - V^2\cos^2\theta)$$

In general, the relation $V << C$ is given, so that the following relation is established:

$$C^2 \approx C^2 - V^2\cos^2\theta \quad (4)$$

The flow velocity V of the fluid is given as follows:

$$V = (C^2/2L\cos\theta) \cdot \Delta T \quad (5)$$

In this manner, when the propagation time difference $\Delta T$ is measured, the flow velocity V can be obtained in accordance with equation (5).

The propagation time difference $\Delta T$ is generally as small as $10^{-4}$ times the propagation time Td or Tu. For example, when the conduit 100 shown in FIG. 1 comprises a water pipe which has a diameter of 100 mm, and the flow velocity V is 1 m/sec, the propagation time difference $\Delta T$ is about 150 nsec. Furthermore, when the conduit 100 comprises a gas pipe which has a diameter of 10 mm, and the fluid velocity is 10 cm/sec, the propagation time difference $\Delta T$ is about 27 nsec.

It is normally rather difficult to precisely measure a very small propagation time difference $\Delta T$. In the flow meter of this type, the ultrasonic transducers 101 and 102 are simultaneously driven by separate drivers, respectively, so as to decrease crosstalk components received by the ultrasonic transducers 101 and 102. A time difference is measured as the propagation time difference $\Delta T$ when the ultrasonic wave from the ultrasonic transducer 101 is received by the ultrasonic transducer 102 and vice versa. The drive timings of the ultrasonic transducers 101 and 102 may be different (corresponding to a difference $\Delta t$) by several nanoseconds to several tens of nanoseconds in accordance with a difference between the switching characteristics (i.e. a difference between the rise and decay times of the transistors) and a difference between lead wires connecting the ultrasonic transducers 101 and 102 with their corresponding drivers. The difference $\Delta t$ is actually measured as part of the propagation time difference $\Delta T$, so that an offset in the measured value for the flow velocity V occurs.

In the flowmeter of this type, the arrival timings of the ultrasonic waves from the ultrasonic transducer 101 at the ultrasonic transducer 102 and vice versa are determined in accordance with an Nth ultrasonic wave (where N corresponds, for example, to the wave which has a maximum magnitude). In this condition, when frequencies f1 and f2 of the ultrasonic waves respectively produced from the ultrasonic transducers 101 and 102 do not coincide, a frequency difference is produced as an arrival timing difference $\Delta t'$. The difference $\Delta t'$ is given as $N(1/f1 - 1/f2)$. For example, if the frequencies f1 and f2 are 1.00 MHz and 1.01 MHz, respectively, and N is 5, the difference $\Delta t'$ is about 50 nsec. The difference $\Delta t'$ results in an offset in the measured value in the same manner as does the difference $\Delta t$.

Conventionally, the offset value caused by the differences $\Delta t$ and $\Delta t'$ is eliminated in the following manner. The ultrasonic transducers 101 and 102 are driven when the fluid is interrupted in the conduit 100. In this condition, an offset is measured in accordance with equations (3) and (5). In subsequent empirical measurement, the offset previously measured is subtracted from the measured value of the flow velocity V obtained in accordance with equation (5). Thus, an actual value of the flow velocity V is obtained.

However, the fluid must be interrupted during the offset measurement. For this purpose, the conduit 100 must be removed from the corresponding piping, or the fluid supply to the conduit 100 must be stopped. Therefore, the offset elimination method of the type described above is difficult to apply with a flowmeter which is operating continuously. Furthermore, a change in offset over time cannot be precisely measured.

SUMMARY OF THE INVENTION

It is an object of the present invention to provide an ultrasonic flowmeter which is capable of eliminating an offset of a measured flow rate, which is caused by the drive timing difference and/or frequency difference of a pair of ultrasonic transducers, without stopping the flow of a fluid.

In order to achieve the above object of the present invention, there is provided an ultrasonic flowmeter, comprising: a conduit through which a fluid flows; a pair of ultrasonic transducers disposed in said conduit so as to oppose each other such that a line connecting said pair of ultrasonic transducers is inclined by a predetermined angle with respect to a fluid flowing direction; driving means for simultaneously driving said pair of ultrasonic transducers; time difference measuring means for measuring a primary time difference between a time measured when one ultrasonic transducer of said pair of ultrasonic transducers receives an ultrasonic wave which is radiated from the other ultrasonic transducer and a time measured when said other transducer receives an ultrasonic wave which is radiated from said one ultrasonic transducer, for measuring a secondary time difference between a time measured when said one ultrasonic transducer receives an ultrasonic wave which is radiated from said one ultrasonic transducer and reflected by said other ultrasonic transducer and a time measured when said other ultrasonic transducer receives an ultrasonic wave which is radiated from said other ultrasonic transducer and reflected by said one ultrasonic transducer and for producing primary and secondary time difference data by respectively adding signs thereto in accordance with an arrival order of the ultrasonic waves; and calculating means for subtracting the secondary time difference data from the primary time difference data to calculate a flow rate of the fluid, using a subtracted result as data of a propagation time difference between the propagation time of the ultrasonic wave from said other ultrasonic transducer to said one ultrasonic transducer and the propagation time of the ultrasonic wave from said one ultrasonic transducer to said other ultrasonic transducer.

DETAILED DESCRIPTION OF THE PREFERRED EMBODIMENTS

Figure 2:
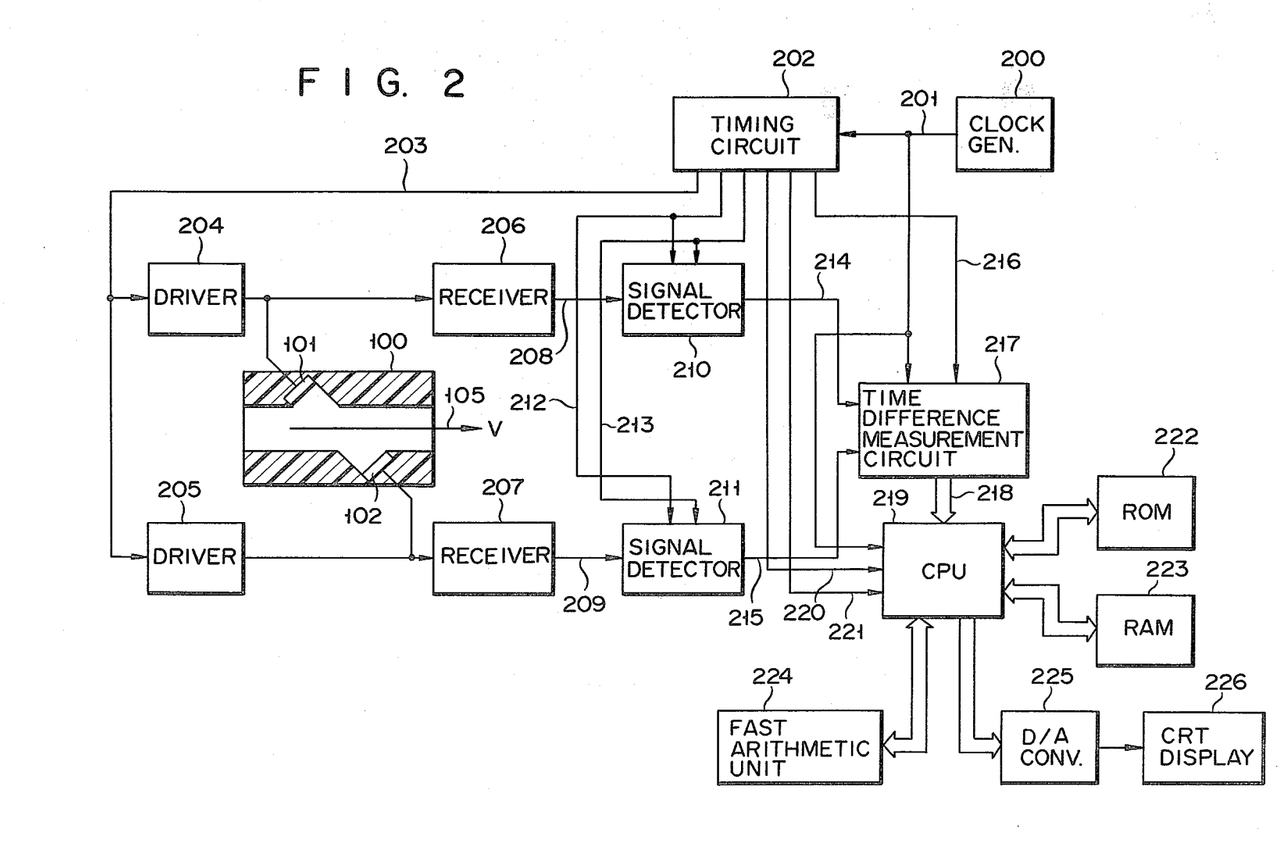
FIG. 2 is a block diagram of the ultrasonic flowmeter according to the first embodiment of the present invention.

FIG. 2 is a block diagram showing the overall arrangement of an ultrasonic flowmeter according to a first embodiment of the present invention. A clock generator 200 generates a clock signal 201 which has a sufficient period to measure primary and secondary time differences with a predetermined precision. A timing circuit 202 generates various types of timing pulses to be used in related elements by dividing the clock signal 201.

A drive timing pulse 203 among the output pulses from the timing circuit 202 is supplied to drivers 204 and 205 so as to determine repetition drive timings of ultrasonic transducers 101 and 102, respectively, at predetermined periods. The drivers 204 and 205 simultaneously drive the respective transducers 101 and 102 mounted in the conduit 100 described with reference to FIG. 1. Pulsed ultrasonic waves are produced by the transducers 101 and 102, respectively.

The ultrasonic waves respectively produced by the transducers 101 and 102 are propagated inside the conduit 100. Each ultrasonic wave requires a propagation time Td or Tu in accordance with equation (1) or (2) to reach the corresponding ultrasonic transducer. The ultrasonic waves respectively reaching the transducers 101 and 102 are respectively reflected thereby. Reflected ultrasonic waves from the transducers 101 and 102 are propagated through the conduit 100 in accordance with the propagation times Tu and Td obtained by equations (2) and (1), respectively. The reflected ultrasonic waves from the transducers 101 and 102 are then received by the transducers 102 and 101, respectively.

When the fluid flows in the conduit 100 in the direction indicated by an arrow 105, the ultrasonic wave radiated from the transducer 101 or reflected thereby requires the propagation time Td to reach the transducer 102. Similarly, the ultrasonic wave radiated from the transducer 102 or reflected thereby requires the propagation time Tu to reach the transducer 101.

In this case, a total propagation time Ta of the ultrasonic wave radiated from the transducer 101, reflected by the transducer 102 and received by the transducer 101 is given as follows:

$$Ta = Td + Tu \qquad (6)$$

Similarly, a total propagation time Tb of the ultrasonic wave radiated from the transducer 102, reflected by the transducer 101 and received by the transducer 102 is given as follows:

$$Tb = Tu + Td \qquad (7)$$

As is apparent from equations (6) and (7), the following relation is given:

$$Ta = Tb \qquad (8)$$

Relation (8) is constantly established irrespective of the flow condition of the fluid.

Assume that there arises a difference ΔT2 (secondary time difference) between a propagation time measured when the ultrasonic wave is radiated from the transducer 101, is reflected by the transducer 102 and is received by the transducer 101, and a propagation time measured when the ultrasonic wave is radiated from the transducer 102, is reflected by the transducer 101 and is received by the transducer 102. This difference ΔT2 is caused by the difference Δt in the drive timings of the transducers 101 and 102 and a difference between the ultrasonic frequencies respectively produced from the transducers 101 and 102. A primary time difference ΔT1 is measured between propagation times of ultrasonic waves from one transducer to the other and vice versa. After measuring the primary and secondary time differences $\Delta T1$ and $\Delta T2$ and assigning them suitable signs in accordance with the arrival order of the ultrasonic waves, the secondary time difference $\Delta T2$ is subtracted from the primary time difference $\Delta T1$, thereby obtaining the actual propagation time difference $\Delta T$. A calculation is then performed using the propagation time difference $\Delta T$ in accordance with equation (5) so as to provide the flow velocity V which is free from an offset.

The steps of measurement of the ultrasonic flowmeter will be described hereinafter. The ultrasonic waves received by the transducers 101 and 102 are converted to electric signals, respectively. The electric signals from the transducers 101 and 102 are then amplified by receivers 206 and 207, respectively. Output signals 208 and 209 from the receivers 206 and 207 are supplied to signal detectors 210 and 211, respectively.

Figure 3:
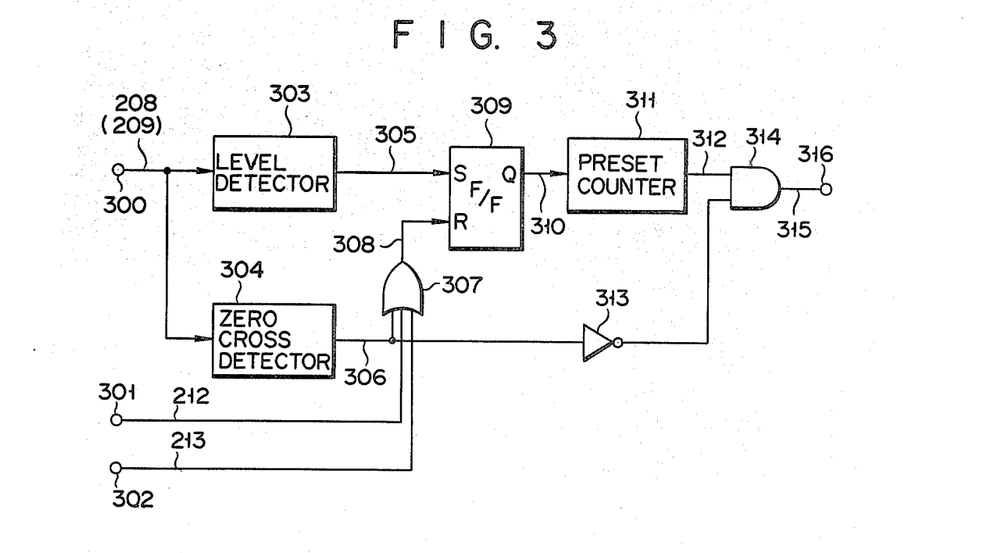
FIG. 3 is a block diagram of a signal detector shown in FIG. 2.
Figure 4:
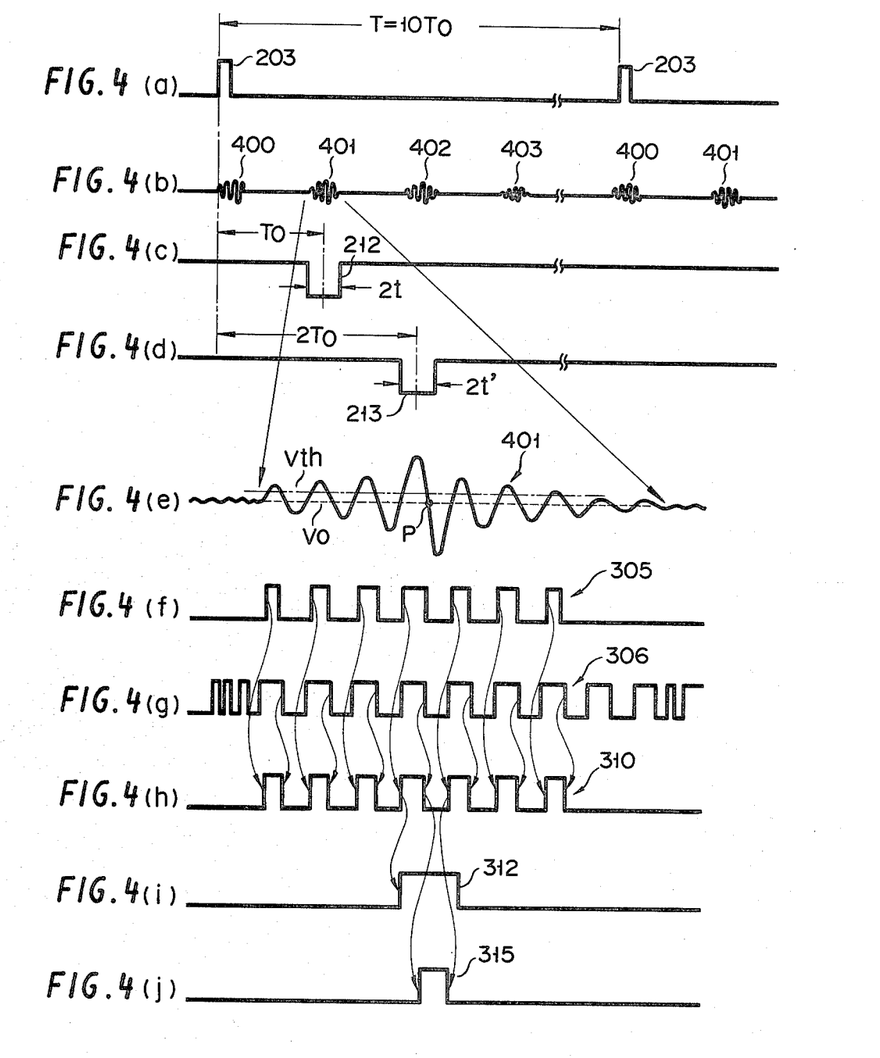
FIG. 4, part (a) to part (j), are timing charts for explaining the mode of operation of the signal detector shown in FIG. 3.

The signal detectors 210 and 211 are circuits for producing signals required for measurements of the primary and secondary time differences $\Delta T1$ and $\Delta T2$ in accordance with timing pulses 212 and 213 supplied from the timing circuit 202, respectively. FIG. 3 shows a detailed arrangement of the signal detector 210 (or 211). FIG. 4, part (a) to part (j), are timing charts for explaining the mode of operation of the signal detector 210 or 211.

Referring to FIG. 3, a terminal 300 receives an output signal 208 (or 209) from the receiver 206 (or 207). Terminals 301 and 302 receive gate timing pulses 212 and 213, respectively, from the timing circuit 202. FIG. 4 part (a) shows the drive timing pulse 203 supplied from the timing circuit 202 to the drivers 204 and 205. FIG. 4 part (b) shows a signal 208 (or 209). Referring to FIG. 4 part (b), a signal 400 is a leaked component of the output signal supplied from the driver 204 (205) to the receiver 206 (207). A signal 401 is a component of the ultrasonic wave which is radiated from the transducer 102 (101) and received by the transducer 101 (102). A signal 402 is a component of the ultrasonic wave which is radiated from the transducer 101 (102), is reflected by the transducer 102 (101), and is received by the transducer 101 (102). The gate timing pulses 212 and 213, respectively shown in FIG. 4, part (c) and part (d), are pulses generated in time intervals respectively corresponding to the periods of the signals 401 and 402.

The centers of the durations of the gate timing pulses 212 and 213 are set at times respectively lagged by time intervals T0 and 2T0 from the drive timing pulse 203. The time interval T0 is given as follows:

$$T0 \simeq (2l+L)/C0 \qquad (9)$$

where C0 is the sonic velocity in the fluid under normal measuring conditions.

Pulse widths 2t and 2t' of the gate timing pulses 212 and 213 are set to correspond to about 15 to 20% and about 15 to 30% of the time interval T0, respectively. A period T of the timing pulse 203 is set to be a time interval (e.g., $T \simeq 10T0$) during which the ultrasonic wave radiated from the transducer 101 (102), reflected by the transducer 102 (101) and received by the transducer 101 (102) is sufficiently attenuated so as not to interfere with the next ultrasonic wave radiated from the transducer 101 (102).

Referring to FIG. 3, the signal 208 (209) is supplied to a level detector 303 and a zero cross detector 304. The signal 401 among signals 208 (209) is illustrated in an enlarged manner in FIG. 4 part (e). Output signals 305 and 306 from the level detector 303 and the zero cross detector 304 are respectively shown in FIG. 4, part (f) and part (g), so as to correspond to the waveform shown in FIG. 4 part (e). The signal 305 is inverted every time the signal 208 (209) crosses a threshold level Vth (FIG. 4 part (e)) which is preset to be a few times the noise level. The signal 306 is inverted every time the signal 208 (209) crosses zero level V0.

The output signal 305 from the level detector 303 is supplied to a set input end S of an R-S flip-flop (F/F) 309. The output signal 306 from the zero cross detector 304 is supplied to an OR gate 307 together with the gate timing pulses 212 and 213. An output signal 308 from the OR gate 307 is supplied to a reset input end R of the flip-flop 309. Since the output signal 308 from the OR gate 307 is kept high while the gate timing pulses 212 and 213 are not supplied to terminals 301 and 302, the flip-flop 309 is kept reset irrespective of the logic state of the output signal 305 from the level detector 303. When the gate timing pulses 212 and 213 are supplied to the terminals 301 and 302, the flip-flop 309 is set at the leading edge of the output signal 305 from the level detector 303, and is reset at the trailing edge of the output signal 306 from the zero cross detector 304. The flip-flop 309 then produces an output signal 310 as shown in FIG. 4 part (h).

The output signal 310 from the flip-flop 309 is supplied to a preset counter 311 which then counts the pulses of the output signal 310. Which wave in the signal 401 has the maximum magnitude may be determined in accordance with the driving conditions and Q (quality factor) of the transducers 101 and 102. If the Nth wave has the maximum magnitude, N is preset in the preset counter 311. When the count of the preset counter 311 reaches N (=4 in this embodiment), the present counter 311 produces a pulse 312 which has a pulse width as shown in FIG. 4 part (i). The pulse 312 is supplied to one input end of an AND gate 314, and an inverted signal of the output signal 306 from the zero cross detector 304 is supplied to the other input end thereof through an inverter 313. An output signal 315 from the AND gate 314 is shown in FIG. 4 part (j). The leading edge of the signal 315 corresponds to the zero-crossing point P of the maximum amplitude wave of the signal 401 shown in FIG. 4 part (e). The signal 315 appears at a terminal 316 as an output signal 214 (215) from the signal detector 210 (211).

Figure 5:
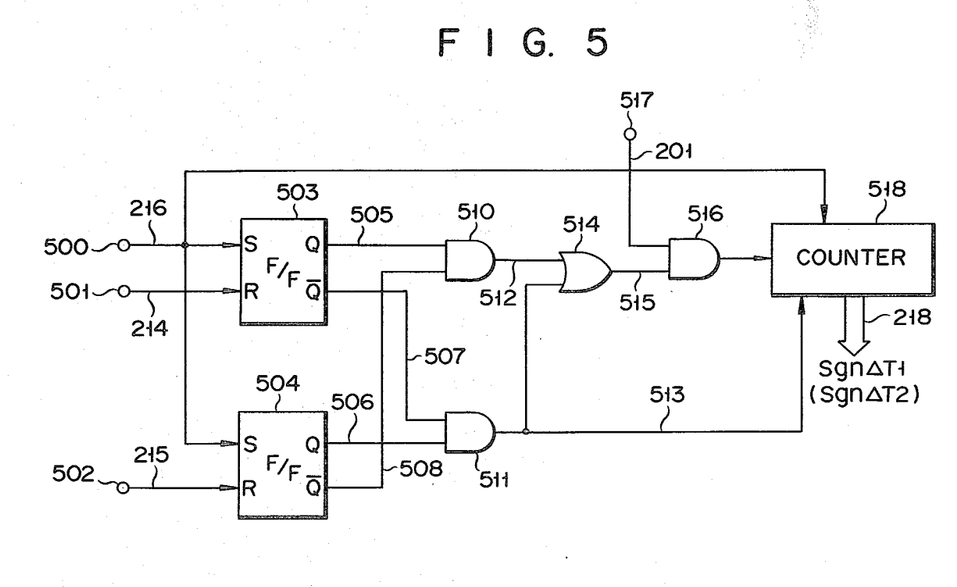
FIG. 5 is a block diagram of a time difference measurement circuit shown in FIG. 2.
Figures 6A, 6J:
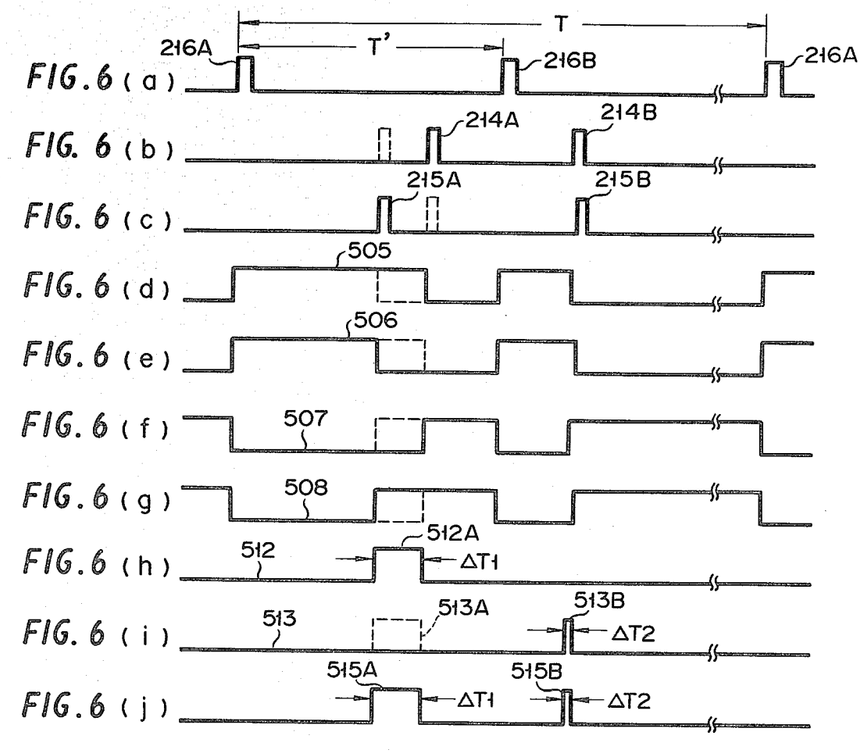
FIG. 6, part (a) to part (j), are timing charts for explaining the mode of operation of the time difference measurement circuit shown in FIG. 5.

Referring again to FIG. 2, the output signals 214 and 215 from the signal detectors 210 and 211, respectively, are supplied to a time difference measurement circuit 217. The time difference measurement circuit 217 measures the primary and secondary time differences $\Delta T1$ and $\Delta T2$. A detailed arrangement of the time difference measurement circuit 217 is shown in FIG. 5. FIG. 6, part (a) to part (j), are timing charts for explaining the mode of operation of the time difference measurement circuit 217.

Referring to FIG. 5, a measurement timing pulse 216 is supplied from the timing circuit 202 to a terminal 500. The pulse 216 is then supplied to set input ends S of R-S flip-flops 503 and 504. The timing pulse 216 comprises a pulse 216A generated at the same timing as the drive timing pulse 203 (FIG. 4 part (a)) and a pulse 216B which is delayed by a predetermined time T' from the pulse 216A, as shown in FIG. 6 part (a). It is noted that the time T' is fixed between the signal 402 (FIG. 4 part (b)) and the next signal 403.

The output signals 214 and 215 from the signal detectors 210 and 211 are supplied to reset input ends R of the flip-flops 503 and 504 through terminals 501 and 502, respectively. The signals 214 and 215 are shown in FIG. 6, part (b) and part (c), respectively. Pulses 214A and 215A of the signals 214 and 215 correspond to the signal 401, whereas pulses 214B and 215B correspond to the signal 402. Q output signals 505 and 506 from the flip-flops 503 and 504 are shown in FIG. 6, part (d) and part (e), respectively. $\overline{Q}$ output signals 507 and 508 from the flip-flops 503 and 504 are shown in FIG. 6, part (f) and part (g), respectively.

The signals 505 and 508 are supplied to an AND gate 510, and the signals 506 and 507 are supplied to an AND gate 511. In this case, a pulse 512A is included in an output signal 512 from the AND gate 510, as shown in FIG. 6 part (h). The pulse 512A has a pulse width (which indicates the primary time difference $\Delta T1$) corresponding to a time interval between the pulses 214A and 215A. A pulse 513B is included in an output signal 513 from the AND gate 511, as shown in FIG. 6 part (i). The pulse 513B has a pulse width (which indicates the secondary time difference $\Delta T2$) corresponding to a time interval between the pulses 214B and 215B.

The output signals 512 and 513 from the AND gates 510 and 511 are logic-ORed by an OR gate 514, as shown in FIG. 6 part (j). An output signal 515 from the OR gate 514 is supplied to one input end of an AND gate 516. The clock signal 201 from the clock generator 200 is supplied to the other input end of the AND gate 516 through a terminal 517. The AND gate 516 is enabled when the output signal 515 from the OR gate 514 is kept high (i.e., time intervals corresponding to the differences $\Delta T1$ or $\Delta T2$, that is, the pulse widths of the pulses 515A and 515B, respectively). The clock signal passing through the AND gate 516 is supplied to a counter 518 which then counts clock pulses, thereby measuring the primary and secondary time differences $\Delta T1$ and $\Delta T2$.

As may be apparent from FIG. 6, part (a) to part (j), the pulse having a width corresponding to the primary time difference $\Delta T1$ appears as the pulse 512A of the output signal 512 from the AND gate 510. When the order of pulses 214A and 215A respectively indicated by dotted lines of FIG. 6, part (b) and part (c) is inverted, the pulse corresponding to the primary time difference $\Delta T1$ appears as the pulse 513A of the output signal 513 from the AND gate 511. In short, the pulse corresponding to the primary time difference $\Delta T1$ appears as the pulse 512A or 513A of the output signal 512 or 513 from the AND gate 510 or 511 in accordance with whichever of the ultrasonic waves from the transducers reaches the corresponding transducer faster than the other. The flow direction can be determined in accordance with whether the pulse corresponding to the primary time difference $\Delta T1$ appears as the pulse 512A or 513A, thereby determining a sign to be added to the primary time difference $\Delta T1$.

In accordance with the fact that the pulse 214B is supplied before the pulse 215 or vice versa (i.e., in accordance with whichever one of the ultrasonic waves radiated from the transducer 101 (102) and reflected by the transducer 102 (101) reaches the transducer 101 (102) before the other), the pulse corresponding to the secondary time difference $\Delta T2$ appears as the pulse 512B or 513B of the output signal 512 or 513 of the AND gate 510 or 511. In accordance with the pulse 512B or 513B corresponding to the secondary time difference $\Delta T2$, a sign to be added to the difference $\Delta T2$ is determined.

One of the output signals 512 and 513 from the AND gates 510 and 512 (e.g., the signal 513 in this embodiment) is used as a signal for designating the signs to be added, to the primary and secondary time difference $\Delta T1$ and $\Delta T2$, respectively. In the case shown with reference to FIG. 6, the sign "+" is added to the data of the first primary time difference $\Delta T1$, and the sign "−" is added to the data of the secondary time difference $\Delta T2$. More specifically, a one-bit data which indicates the positive or negative sign is stored in a sign bit (MSB) of output data 218 of the counter 518.

Figure 7:
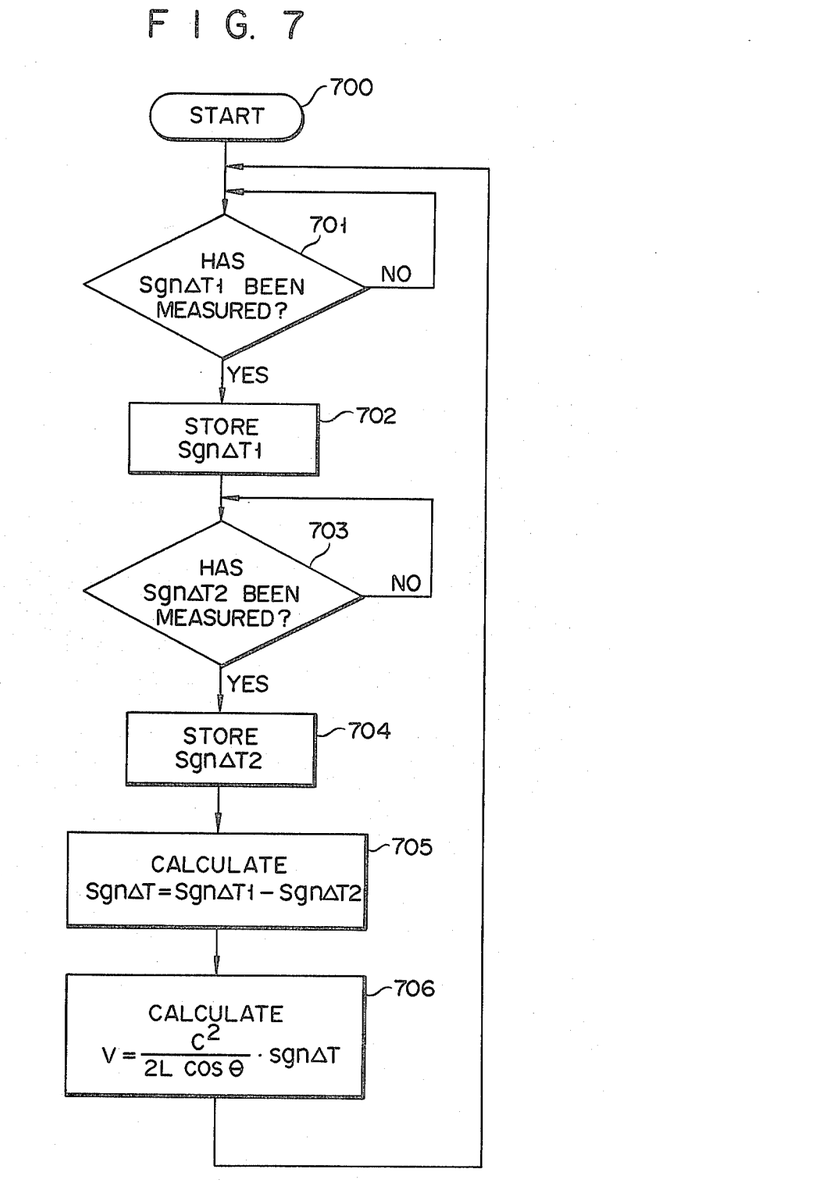
FIG. 7 is a flow chart for explaining the steps of calculating the flow velocity using the ultrasonic flowmeter according to the first embodiment.

The output data from the counter 518, that is, the output data 218 from the time difference measurement circuit 217 is fetched in a CPU (central processing unit) 219 which comprises a microprocessor. The CPU 219 executes the flow velocity computation routine in accordance with the flow chart shown in FIG. 7. In start step 700, a program stored in a ROM 222 is loaded in the CPU 219. It is then determined in step 701, in accordance with the timing pulse 220 from the timing circuit 202, whether or not the primary time difference $\Delta T1$ has been measured. If YES in step 701, data 218 (sgn$\Delta T1$) is stored in a RAM 223 through the CPU 219 in step 702. It is then determined in step 703, in accordance with the timing pulse 221 from the timing circuit 202, whether or not the secondary time difference $\Delta T2$ has been measured. If YES in step 703, data 218 (sgn$\Delta T2$) is stored in the RAM 223 through the CPU 219 in step 704. When step 704 is completed, data sgn$\Delta T1$ and sgn$\Delta T2$ are read out from the RAM 223 and are fetched in the CPU 219. In step 705, propagation time difference data sgn$\Delta T$ with a sign is calculated in accordance with the flow direction of the fluid as follows:

$$sgn\Delta T = sgn\Delta T1 - sgn\Delta T2 \qquad (10)$$

The data sgn$\Delta T$ indicates the actual propagation time difference which does not include the differences $\Delta t$ and $\Delta t'$. The data sgn$\Delta T$ is stored in the RAM 223. In step 706, the data sgn$\Delta T$ stored in the RAM 223 is supplied to a fast arithmetic unit 224 through the CPU 219. The flow velocity V is calculated by the arithmetic unit 224 as follows:

$$V = (C^2/2L \cos \theta) sgn\Delta T \qquad (11)$$

where C, L and $\theta$ have the same meanings as previously described. Since the transducers 101 and 102 are mounted in the conduit 100, the values indicated by symbols C, L and $\theta$ may be regarded as constants. As a result, let $(C^2/2L \cos \theta)$ be given as a coefficient K:

$$K = C^2/2L \cos \theta \qquad (12)$$

The flow velocity V given by equation (11) above is free from the offset caused by the differences $\Delta t$ and $\Delta t'$. This value has a sign in accordance with the flow direction of the fluid. Steps 701 to 706 are repeated every time the transducers 101 and 102 are driven.

Data of the flow velocity V which is calculated by the arithmetic unit 224 is supplied to a D/A converter 225 through the CPU 219. An output signal from the D/A converter 225 is supplied to a Y-axis input end of a CRT display 226, thereby displaying a waveform which indicates a change in flow velocity V over time on the CRT display 226. Integration of the value of the flow velocity V will yield a flow volume.

Figure 8:
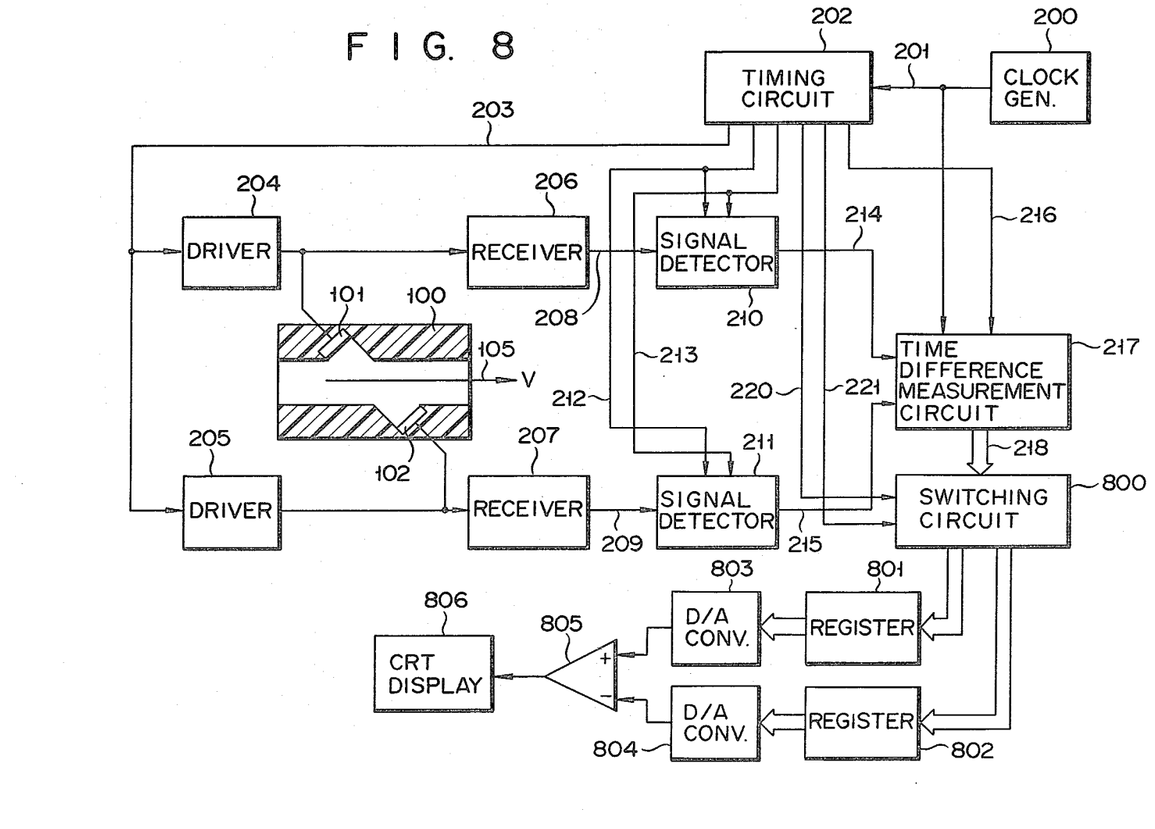
FIG. 8 is a block diagram of an ultrasonic flowmeter according to a second embodiment of the present invention.

FIG. 8 shows an ultrasonic flowmeter according a second embodiment of the present invention. In this embodiment, the arrangement for obtaining the data 218 (sgnΔT1 and sgnΔT2) of the flowmeter is the same as that of the first embodiment. The process for calculating the flow velocity V using the data 218 of the second embodiment differs from that of the first embodiment.

Referring to FIG. 8, the data 218 is supplied to a switching circuit 800. When a timing pulse 220 is supplied from a timing circuit 202 to the switching circuit 800, the switching circuit 800 supplies data 218 (sgnΔT1) to a register 801. Similarly, when a timing pulse 221 is supplied from the timing circuit 202 to the switching circuit 800, the switching circuit 800 supplies data sgnΔT2 to a register 802. The data sgnΔT1 and sgnΔT2 are stored in the registers 801 and 802, respectively. The data sgnΔT1 and sgnΔT2 are simultaneously read out from the registers 801 and 802 and are supplied to D/A converters 803 and 804, respectively. Output signals from the D/A converters 803 and 804 are supplied to a differential amplifier 805. The differential amplifier 805 multiplies a value obtained by subtracting the input data from each other by the coefficient K (eq. (12)), thereby obtaining the flow velocity V. An output signal from the differential amplifier 805 is supplied to a Y-axis input end of a CRT display 806, thereby displaying a waveform which indicates a change in flow velocity V of the fluid.

What we claim is:
1. An ultrasonic flowmeter, comprising:
    a conduit through which a fluid flows;
    a pair of ultrasonic transducers disposed in said conduit so as to oppose each other such that a line connecting said pair of ultrasonic transducers is inclined by a predetermined angle with respect to a fluid flowing direction;
    driving means for simultaneously driving said pair of ultrasonic transducers;
    time difference measuring means for measuring a primary time difference between a time measured when one ultrasonic transducer of said pair of ultrasonic transducers receives an ultrasonic wave which is radiated from the other ultrasonic transducer and a time measured when said other transducer receives an ultrasonic wave which is radiated from said one ultrasonic transducer, for measuring a secondary time difference between a time measured when said one ultrasonic transducer receives an ultrasonic wave which is radiated from said one ultrasonic transducer and reflected by said other ultrasonic transducer and a time measured when said other ultrasonic transducer receives an ultrasonic wave which is radiated from said other ultrasonic transducer and reflected by said one ultrasonic transducer, and for producing primary and secondary time difference data by respectively adding signs thereto in accordance with an arrival order of the ultrasonic waves; and
    calculating means for subtracting the secondary time difference data from the primary time difference data to calculate a flow rate of the fluid using a subtracted result as data of a propagation time difference between the propagation time of the ultrasonic wave from said other ultrasonic transducer to said one ultrasonic transducer and the propagation time of the ultrasonic wave from said one ultrasonic transducer to said other ultrasonic transducer.

2. An ultrasonic flowmeter according to claim 1, wherein said time difference measuring means includes a counter for counting clock pulses generated in time intervals corresponding to the primary time difference and the secondary time difference and for determining a logic level of a sign bit of output data from said counter in accordance with the arrival order of the ultrasonic waves.

3. An ultrasonic flowmeter according to claim 1, wherein said calculating means calculates the flow velocity V of the fluid in accordance with the following equation:

$$V = (C^2/L \cos\theta) sgn\Delta T$$

$$sgn\Delta T = sgn\Delta T1 - sgn\Delta T2$$

where
C: a sonic velocity in a fluid at rest,
L: length of a region which is influenced by the flow velocity of the fluid between said pair of ultrasonic transducers,
$\theta$: an angle formed by a flow direction and a line connecting said pair of ultrasonic transducers,
$\Delta T$: the propagation time difference,
$\Delta T1$: the primary time difference,
$\Delta T2$: the secondary time difference, and
sgn: the sign of the primary and secondary time differences $\Delta T1$ and $\Delta T2$ determined in accordance with the arrival order of the ultrasonic waves.

* * * * *